(12) United States Patent
Sytsma et al.

(10) Patent No.: US 7,188,841 B1
(45) Date of Patent: Mar. 13, 2007

(54) SECONDARY PISTON SEAL

(75) Inventors: Steven J. Sytsma, Muskegon, MI (US); Jason Bieneman, Brunswick, MI (US)

(73) Assignee: Dana Corporation, Toledo, OH (US)

( * ) Notice: Subject to any disclaimer, the term of this patent is extended or adjusted under 35 U.S.C. 154(b) by 60 days.

(21) Appl. No.: 11/036,670

(22) Filed: Jan. 14, 2005

(51) Int. Cl.
*F16J 9/06* (2006.01)

(52) U.S. Cl. ............... 277/472; 277/437; 277/453; 277/454

(58) Field of Classification Search ........... 277/435, 277/437, 467, 472, 476, 466, 453, 454
See application file for complete search history.

(56) References Cited

U.S. PATENT DOCUMENTS

| | | | | |
|---|---|---|---|---|
| 2,052,077 A | * | 8/1936 | Bristow | 277/472 |
| 2,631,907 A | * | 3/1953 | Johnson, Jr. | 277/468 |
| 2,967,745 A | * | 1/1961 | Stevens | 277/456 |
| 4,669,369 A | * | 6/1987 | Holt et al. | 92/160 |
| 5,001,965 A | * | 3/1991 | Ruddy et al. | 277/453 |
| 5,253,877 A | * | 10/1993 | DeBiasse et al. | 277/437 |
| 5,474,307 A | * | 12/1995 | DeBiasse et al. | 277/451 |
| 6,705,616 B2 | * | 3/2004 | Fujii et al. | 277/434 |

FOREIGN PATENT DOCUMENTS

| | | | |
|---|---|---|---|
| CN | 1515792 A | | 7/2004 |
| GB | 2117868 | * | 10/1983 |
| JP | 60-109668 | * | 6/1985 |

OTHER PUBLICATIONS

English Abstract for CN-1515792-A (1 page).

* cited by examiner

*Primary Examiner*—Alison Pickard
(74) *Attorney, Agent, or Firm*—Marshall & Melhorn LLC

(57) ABSTRACT

A secondary seal is provided for an internal combustion engine having a piston, cylinder bore, ring seal, secondary seal, and leak path. Forces are applied from the combustion side of the piston through a cylinder gap and a leak path to the secondary seal. The secondary seal, seated on the piston and ring seal, transmits the forces generally axially to the piston and ring seal, thereby controllably limiting the radial force between the ring seal and cylinder bore.

20 Claims, 2 Drawing Sheets

SECONDARY PISTON SEAL

FIELD OF THE INVENTION

The present invention relates to a seal for a piston and in particular to a secondary piston seal for an internal combustion engine.

BACKGROUND

Internal combustion engines, including diesel engines, subject piston top ring seals to high pressures and temperatures that cause wear on the seals and on the cylinder walls of the engine. Piston ring seals are generally seated in a groove formed in the outer circumference of the piston and perform at least two functions to ensure efficient operation of the engine. First, during the power cycle, the ring seals prevent gases under high pressure from bypassing the piston. Thus, maximum driving force is applied to the piston. Second, on the return stroke the ring seals prevent lubricants from entering the combustion chamber. If the ring seals fail to perform efficiently, the engine will not develop the maximum power due to "blow-by" on the power cycle. Additionally, if the ring seals leak during the return stroke, lubricants will enter the combustion chamber, thereby reducing combustion efficiency and increasing air pollution by way of the exhaust system.

Generally, the ring seal provides the interface between the piston and the cylinder wall. Thus, reduced friction is desired. Conventional top ring seals experience radial excursion during high-pressure periods in the combustion cycle. More particularly, the high-pressure gases leak behind the ring seal and force an outwardly radial excursion of the ring seal against the cylinder wall. The result is reduced efficiency of the lubricating film, and thus the film does not fully protect the ring seal and the cylinder wall from direct frictional contact. The result is excessive wear of both the ring seal and the cylinder wall.

Because of this, there has been a need for a piston seal that produces lesser radial forces between the ring seal and the cylinder wall during maximum chamber pressures. Use of such a piston seal results in improved sealing, reduced wear, and it provides efficient lubricant action throughout the piston stroke.

SUMMARY

A secondary sealing system for an internal combustion engine is disclosed. The engine has at least one axially extending cylinder bore, a piston receivable within the cylinder bore. The piston includes an outer annular groove extending radially inwardly of an outer periphery of the piston. A ring seal is seated in the outer annular groove. A radial outer surface of the ring seal extends radially outwardly of the outer periphery of the piston to selectively engage an inner surface of the cylinder bore, a leak path from combustion gases being formed by the cylinder bore, the piston and the ring seal and the outer annular groove.

The secondary sealing system includes a piston surface providing a first seat and a ring seal surface providing a second seat. A secondary seal with a generally annular body and an inner end and an outer end is disposed between the piston and the ring seal. The inner end of the secondary seal engages the first seat and the outer end of the secondary seal engages the second seat.

The generally annular secondary seal is so seated as to transmit the force, created by combustion pressures to both the piston and the ring seal. Rather than allowing significant forces to be applied to the inner circumference of the ring seal, the secondary seal transmits forces generally axially of the piston and ring seal. By reducing outward radial excursion of the ring seal, efficiency of the internal combustion is increased. At the same time, wear is reduced for the ring seal and cylinder bore. A further advantage includes reduced "lift off" of the ring seal from the non-combustion side of the outer annular groove of the piston during the piston's change of direction. Still further, the secondary seal provides an additional heat flow path between the ring seal and the piston.

BRIEF DESCRIPTION OF THE DRAWINGS

The present invention will now be described, by way of example, with reference to the accompanying drawings, in which.

In the description that follows, the same reference numbers may refer to the same or similar components.

DESCRIPTION

Figure 1:
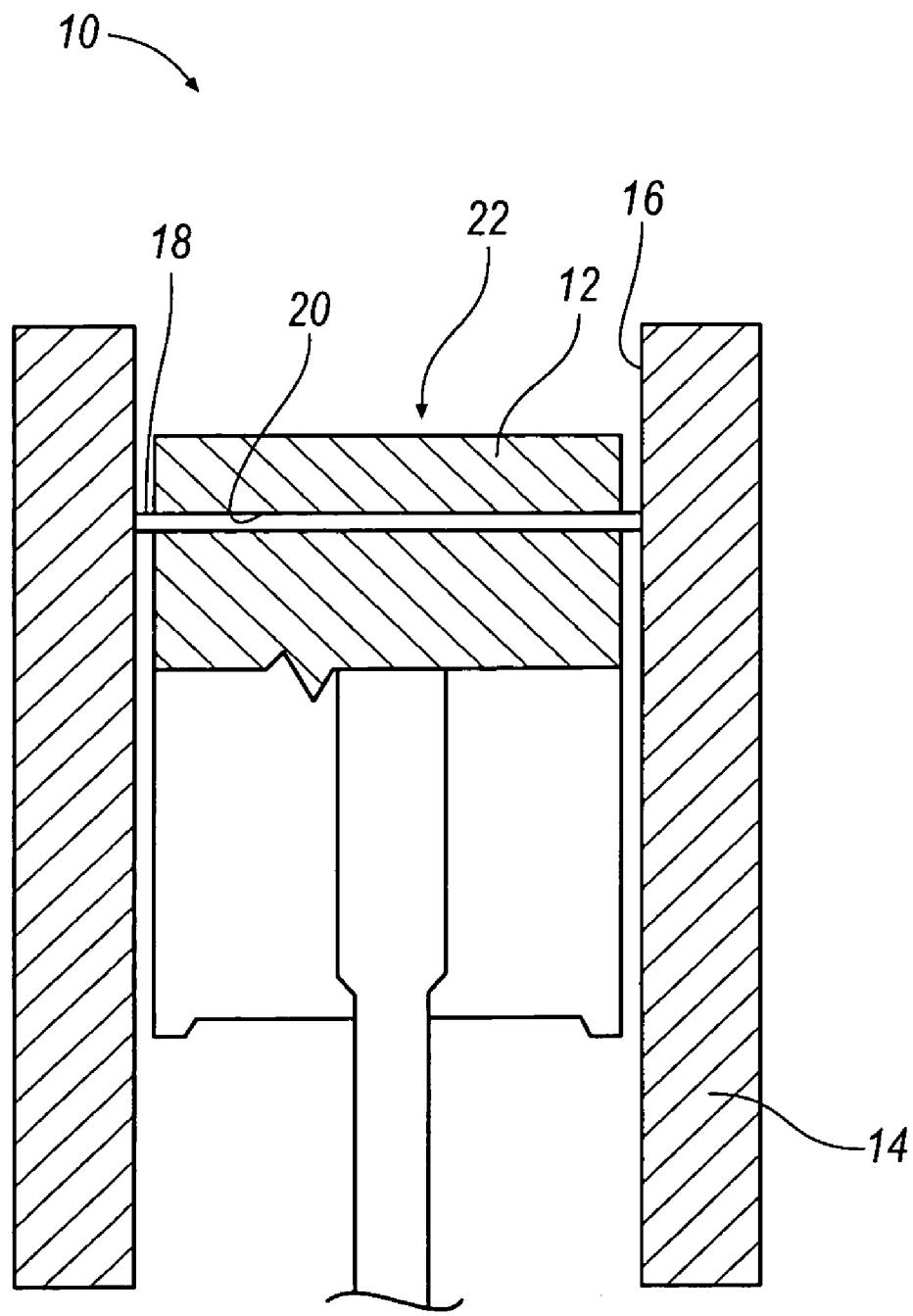
FIG. 1 is a general representation of a conventional reciprocating piston within a cylinder of an internal combustion engine.

Referring to FIG. 1, there is shown a generic piston and piston ring assembly 10 in an internal combustion engine. Piston 12 reciprocates within a cylinder 14 defined by a cylinder bore 16. A ring seal 18 surrounds piston 12 and is generally seated in an outer annular groove 20 formed in the outer circumference of piston 12. Ring seal 18 substantially prevents the flow of combustion gases or other material (collectively, combustion material) that attempt to flow under high pressure from the combustion side 22 of piston 12 beyond ring seal 18. Lubricants are provided in a conventional manner (not shown), preventing direct frictional contact between ring seal 18 and cylinder bore 16.

Figure 2:
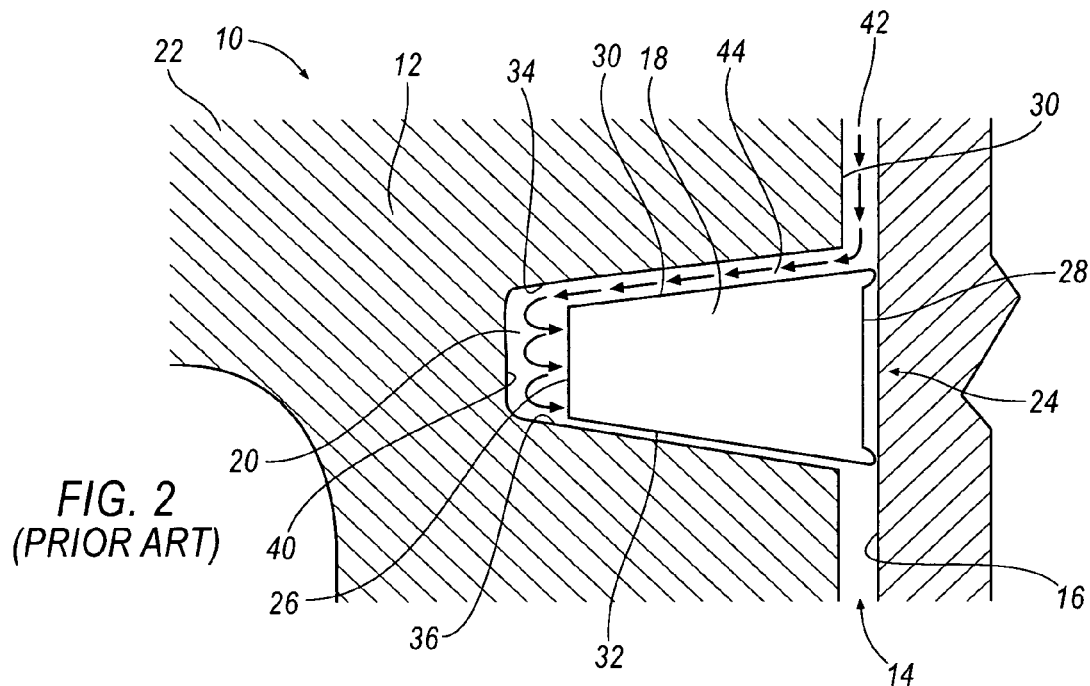
FIG. 2 is a fragmentary sectional view of a conventional piston and ring seal.

FIG. 2 illustrates a conventional ring seal system 24. Ring seal 18 is shown seated in outer annular groove 20 of piston 12. Seal 18 is defined by a radial inner surface 26, a radial outer surface 28, a radially extending upper surface 30, and a radially extending lower surface 32. In turn, outer annular groove 20 is defined by a radially extending upper surface 34, a radially extending lower surface 36, and a radial inner surface 40. During the combustion cycle, high pressures occur near the top dead center position of piston 12, causing an excursion of ring seal 18 radially outwardly of outer annular groove 20.

Excursion of ring seal 18 is caused by forces applied to the radial inner surface 26 due to leaked combustion material under combustion pressures. The combustion materials follow a leak path 42. Under the pressure of combustion leak path 42 is formed by the cylinder bore 16, the piston 12, the ring seal 18, and the outer annular groove 20 as shown by the arrows. Thus, near the top dead center position of piston 12, high radial forces act on radial inner surface 26 of ring seal 18. The resulting forces cause the outward radial excursion of ring seal 18.

Unfortunately, the forces applied to the radial inner end 26 of ring seal 18 degrade the performance of the piston and piston ring assembly 10. Due to the very high radial forces, an undesirably high force may be exerted between the ring seal 18 and cylinder bore 16.

Figure 3:
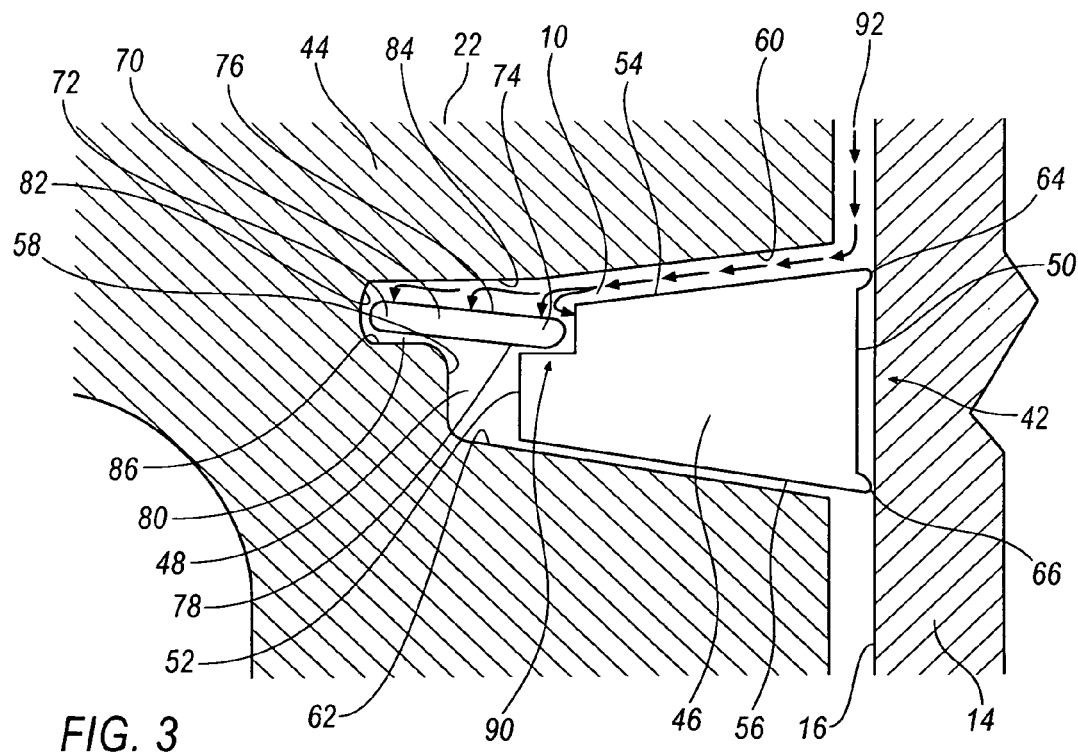
FIG. 3 is a view similar to FIG. 2, but showing an embodiment of a secondary seal according to the invention.

FIG. 3 illustrates in detail a secondary sealing system 42 according to an embodiment of the invention. Piston 44 reciprocates within cylinder 14. Ring seal 46 is partially seated in an outer annular groove 48 of piston 44 and extends radially outwardly thereof. Ring seal 46 has a radial outer surface 50, a radial inner surface 52, a radially extending upper surface 54 and a radially extending lower surface 56. Radially extending upper and lower surfaces 54, 56 may be slightly angled away from a radially extending axis defined by a centerline of ring seal 46. Outer annular groove 48 has a radial inner surface 58, a radially extending upper surface 60 and a radially extending lower surface 62. Sealing protrusions 64, 66 of ring seal 46 sealingly engage cylinder bore 16 if there is no other intermediate coating or after significant wear. Typically, however, a thermal spray material (not shown) is disposed axially between protrusions 64,66 and extends radially outward beyond the protrusions to contact cylinder bore 16. Preferably, it is slightly crowned in the middle. The thermal spray material has excellent friction, wear, and compatibility with the bore material. The interface of sealing protrusions 64, 66 or the intermediate coating and cylinder wall 16 substantially prevents pressure "blow-by" of combustion materials and substantially prevents contamination of the combustion chamber by lubricants (not shown) of the internal combustion engine. In some cases, protrustions 64, 66 do not exist. Instead, the ring may be of a different type including, for example, nitrided stainless, chrome plated, or physical vapor deposition ("PVD") coated rings.

Secondary sealing system 42 includes a secondary seal 70. Secondary seal 70 is generally annular having an inner end 72 and an outer end 74 as well as upper and lower surfaces 76, 78. It has a smaller axial extent than does ring seal 46. Inner end 72 engages a first seat associated with piston 44 and outer end 74 engages a second seat associated with ring seal 46.

Piston 44 includes an inner annular groove 80 having a radial inner surface 82, a radially extending upper surface 84 and a radially extending lower surface 86. The axial extent of inner annular groove 80 is less than the axial extent of outer annular groove 48. Radially extending lower surface 86 acts as the first seat for secondary seal 70 and provides a first pivot point for secondary seal 70. Moreover, as shown in the exemplary embodiment, inner annular groove 80 is formed at the upper axial extent of the outer annular groove 48, a portion of radially extending upper surface 84 being shared with radially extending upper surface 60 of outer annular groove 46. The relative location of the two grooves is important to minimize radially exerted forces resulting from combustion materials as discussed in more detail below.

Combustion pressures on the combustion side 22 of piston 44 are distributed differently with the secondary sealing system 42 as compared to the conventional ring seal system 24. In the present embodiment, combustion materials under combustion pressures follow a leak path 92 formed by the cylinder bore 16, the piston 44, the ring seal 46, the outer annular groove 48, the secondary seal 70, and the inner annular groove 80 as shown by the arrows.

When the combustion materials are present within leak path 92, they apply axial forces upon upper surface 76 of secondary seal 70. These forces result in lower surface 78 of secondary seal 70 being forced axially to press against the first and second seats. The relative location of secondary seal 70 as a result of the location of inner annular groove 80 with respect to outer annular groove 48 and the respective seats means that the radial force being applied to the inner end 52 of ring seal 46 can be controlled by reducing the radial area of contact as shown. Thus, rather than providing undesirably high radial forces contributing to an outwardly radial excursion of ring seal 46, the forces generated by combustion pressures are controlled and distributed generally axially to piston 44 and ring seal 46.

Control of the outward radial excursion of ring seal 46 is provided by way of the design criteria and dimensions of secondary seal 70, the location of secondary seal 70 relative to the first seat and the second seat, the relative axial location of inner annular groove 80 with respect to radial inner surface 58 of outer annular groove 48, as well as the dimensions of the leak path 92. Further, secondary seal 70 may be located generally perpendicular to the axis of cylinder bore 16. Alternatively, as illustrated in FIG. 3, secondary seal 70 may be positioned at an angle relative to that axis so that through the use of the two pivot points and the engagement of end 72 with radial inner surface 82 of inner annular groove 80 and the corresponding engagement of end 74 with radial inner surface 52 of ring seal 46. A component of the force applied by the combustion materials is somewhat radial in nature to help contribute the necessary radial force to provide for proper application of ring seal 46 upon cylinder bore 16. Thus, the second seal 70 is selectively subjected to an axial force with a potential radial force component to controllably limit the radial force between the ring seal 46 and the cylinder bore 16

More specifically, because outward radial excursion of ring seal 46 is modified by the addition of secondary seal 70, excessive contact pressure between sealing protrusions 64, 66 or the intermediate coating and cylinder bore 16 is reduced. The reduced outward radial excursion of ring seal 46 allows lubricants to be utilized more efficiently in the secondary sealing system. The improved efficiencies result in reduced wear on sealing protrusions 64, 66 or the intermediate coating of ring seal 46 and cylinder bore 16. Additionally, use of secondary seal 70 improves fuel economy, wear life, and survivability of ring seal 46 if direct frictional contact occurs. Further, the extension of heat flow path 92 is introduced by secondary seal 70 wherein heat may be transferred directly from secondary seal 70 to piston 44. Heat may also be transferred from ring seal 46 to piston 44 by way of secondary seal 70.

Secondary seal 70 further improves sealing between ring seal 46 and outer annular groove 48 of piston 44 during the axial change of direction of piston 44 while crossing the top dead center position. When piston 44 changes direction, the inertia of ring seal 46 lifts ring seal 46 off of radially extending lower surface 62 of outer annular groove 48. Without secondary seal 70, the resulting loss of seal between ring seal 46 and surface 62 reduces the efficiency of the internal combustion engine. Utilizing secondary seal 70 and during the change of direction of piston 44, the forces applied by secondary seal 70 to the second seat associated with ring seal 46 assists in maintaining sealing engagement between ring seal 46 and surface 62.

The preceding description has been presented only to illustrate and describe exemplary embodiments of the present systems and methods. It is not intended to be exhaustive or to limit the systems and methods to any precise form disclosed. Many modifications and variations are possible in light of the above teaching. It is intended that the scope of the systems and methods be defined by the following claims.

What is claimed is:

1. A secondary sealing system for an internal combustion engine having at least one axially extending cylinder bore, a piston receivable within the cylinder bore and having an outer annular groove extending radially inwardly of an outer periphery of the piston, and a ring seal seated in the outer annular groove, a radial outer surface of the ring seal extending radially outwardly of the outer periphery of the piston to selectively engage an inner surface of the cylinder bore, a leak path from combustion gases being formed by the cylinder bore, the piston and the ring seal and the outer annular groove, the secondary sealing system comprising:
   a piston surface providing a first seat;
   a ring seal surface providing a second seat;
   a secondary seal with a generally annular body and an inner end and an outer end disposed between the piston and the ring seal, the inner end of the secondary seal engaging the first seat and the outer end of the secondary seal engaging the second seat, the seconds seal being selectively subjected to an axial force to controllably limit tae amount of outward radial excursion of the ring seal;
   wherein the leak path further includes the secondary seal, the leak path selectively receiving combustion gasses for applying the axial force upon the secondary seal; and
   wherein the secondary seal has a first pivot point located at a first distance radially outward from the inner end of the secondary seal and a second pivot point located at a second distance radially outward from the inner end of the secondary seal, the second seat being axially disposed from the first seat relative to the cylinder bore, the secondary seal selectively pivoting about the first and second pivot points to move the ring seal with respect to the outer annular groove.

2. The secondary sealing system of claim 1, wherein the first seat comprises an inner annular groove formed in the piston and extending radially inwardly from the outer annular groove, and wherein the leak path further includes the radial inner groove, the leak path selectively receiving combustion gasses for applying the axial force upon the secondary seal.

3. The secondary sealing system of claim 2, wherein an axial extent of the secondary seal is less than the axial extent of the primary seal.

4. The secondary sealing system of claim 3, wherein an axial extent of the inner annular groove is less than the axial extent of the outer annular groove.

5. The secondary sealing system of claim 2, wherein the inner annular groove is formed at the upper axial extent of the outer annular groove, a portion of a radially extending upper surface of the inner annular groove being shared with a radially extending upper surface of the outer annular groove.

6. The secondary sealing system of claim 1, wherein the second seat is a step formed at a radially inner edge of the ring seal.

7. The secondary sealing system of claim 6, wherein the step extends axially downwardly from a radially extending upper surface of the ring seal.

8. The secondary sealing system of claim 1, wherein the first seat comprises an inner annular groove formed in the piston and extending radially inwardly from the outer annular groove and the second seat is a step formed at a radially inner edge of the ring seal.

9. The secondary sealing system of claim 8, wherein the secondary seal is disposed radially inwardly of the outer periphery of the piston.

10. The secondary sealing system of claim 1, wherein the outer annular groove is generally key shaped.

11. The secondary scaling system of claim 1, wherein the first seat provides the first pivot point and the second seat provides the second pivot point.

12. A secondary sealing system for an internal combustion engine having at least one axially extending cylinder bore, a piston receivable within the cylinder bore and having an outer annular groove extending radially inwardly of an outer periphery of the piston, and a ring seal seated in the outer annular groove, a radial outer surface of the ring seal extending radially outwardly of the outer periphery of the piston to selectively engage an inner surface of the cylinder bore, a leak path from combustion gases being formed by the cylinder bore, the piston and the ring seal and the outer annular groove, the secondary sealing system comprising:
   an inner annular groove formed in the piston and extending radially inwardly from the outer annular groove, the axial extent of the inner annular groove being less than the axial extent of the outer annular groove, a portion of the inner annular groove providing a first seat;
   a ring seal surface to provide a second seat;
   a secondary seal with a generally annular body and an inner end and an outer end disposed between the piston and the ring seal, the inner end of the secondary seal engaging the first seat and the outer end of the secondary seal engaging the second seat, the axial extent of the secondary seal being less than the axial extent of the primary seal; the secondary seal being selectively subjected to an axial force to controllably limit the amount of outward radial excursion of the ring seal;
   wherein the leak path further includes the secondary seal and the inner annular groove, the leak path selectively receiving combustion gasses for applying the axial force upon the secondary seal; and
   wherein the secondary seal is a first pivot point located at a first distance radially outward from the inner end of the secondary seal and a second pivot point located at a second distance radially outward from the inner end of the secondary seal, the second seat being axially disposed from the first seat relative to the cylinder bore, the secondary seal selectively pivoting about the first and second pivot points to move the ring seal with respect to the outer annular groove.

13. The secondary sealing system of claim 12, wherein the inner annular groove is formed at the upper axial extent of the outer annular groove, a portion of a radially extending upper surface of the inner annular groove being shared with a radially extending upper surface of the outer annular groove.

14. The secondary scaling system of claim 12, wherein the second seat is a step formed in a radially inner edge of the ring seal, the step extending axially downwardly from a radially extending upper surface of the ring seal.

15. The secondary sealing system of claim 12, wherein the outer annular groove is generally key shaped.

16. The secondary sealing system of claim 12, wherein the first seat provides the first pivot point and the second seat provides the second pivot point.

17. A secondary sealing system for an internal combustion engine comprising:
   an annular ring seal having a radial inner surface, a radial outer surface, a radially extending upper surface and a radially extending lower surface, and a step, the step formed at the intersection of the radial inner surface and the radially extending upper surface;

an annular secondary seal disposed radially inwardly of the ring seal, and having an outer end selectively engaging the step and an inner end;

wherein the secondary seal has a first pivot point located at a first distance radially outward from the inner end of the secondary seal and a second pivot point located at a second distance radially outward from the inner end of the secondary seal, the second pivot point being axially disposed from the first pivot point relative to the ring seal, the secondary seal selectively pivoting about the first and second pivot points to move the ring seal; and wherein the secondary seal is selectively subjected to an axial force to controllably limit the amount of outward radial excursion of the ring seal.

18. The secondary sealing system of claim 17, an axial extent of the secondary seal being less than an axial extent of the ring seal.

19. A secondary sealing system for an internal combustion engine having at least one axially extending cylinder bore, a piston receivable within the cylinder bore having an outer annular groove extending radially inwardly of an outer periphery of the piston, and a ring seal seated in the outer annular groove, the outer annular groove having a radial inner surface, a radially extending upper surface and a radially extending lower surface, the secondary sealing system comprising:

an inner annular groove formed in the piston and extending radially inwardly of the radial inner surface of the outer annular groove;

an annular secondary seal disposed within the inner annular groove and extending radially outwardly into the outer annular groove with an inner and outer end;

wherein the secondary seal has a first pivot point located at a first distance radially outward from the inner end of the secondary seal and a second pivot point located at a second distance radially outward from the inner end of the secondary seal, the second pivot point being axially disposed from the first pivot point relative to the ring seal, the secondary seal selectively pivoting about the first and second pivot points to move the ring seal with respect to the outer annular groove;

wherein the outer annular groove is generally key shaped; and wherein the secondary seal is selectively subjected to an axial force to controllably limit the amount of outward radial excursion of the ring seal.

20. The secondary sealing system of claim 19, wherein an axial extent of the inner annular groove is less than the axial extent of the outer axial groove; and wherein the inner annular groove is formed at the upper axial extent of the outer annular groove, a portion of a radially extending upper surface of the inner annular groove being shared with the radially extending upper surface of the outer annular groove.

* * * * *